United States Patent
Schmitt et al.

(10) Patent No.: US 6,618,662 B2
(45) Date of Patent: Sep. 9, 2003

(54) METHOD AND DEVICE FOR ANTI-SLIP CONTROL, IN PARTICULAR FOR TRACTION CONTROL, IN A MOTOR VEHICLE

(75) Inventors: Johannes Schmitt, Markgroeningen (DE); Andreas Zoebele, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/899,415

(22) Filed: Jul. 5, 2001

(65) Prior Publication Data

US 2002/0024255 A1 Feb. 28, 2002

(30) Foreign Application Priority Data

Jul. 4, 2000 (DE) .......................... 100 32 358

(51) Int. Cl.[7] .................................. B60T 7/12
(52) U.S. Cl. ....................... 701/82; 701/83; 701/84; 180/197
(58) Field of Search .................. 701/82, 70, 71, 701/83, 84, 87, 88, 96; 180/197

(56) References Cited

U.S. PATENT DOCUMENTS 5,978,726 A * 11/1999 Takeda et al. .............. 701/83
6,061,622 A * 5/2000 Probst ....................... 701/84
6,141,618 A * 10/2000 Yamashita et al. .......... 701/84
6,494,282 B1 * 12/2002 Hessmort et al. .......... 180/197

FOREIGN PATENT DOCUMENTS

DE 29 14 165 10/1980

OTHER PUBLICATIONS

*SAE paper 870337, *ASR—Traction Control—A Logical Extension of ABS.*
*FDR—Die Fahrdynamikregelung von Bosch* (FDR—Bosch Vehicle Stability Control System), published in Automobiltechnische Zeitschrift (ATZ) 96, 1994, vol. 11, pp. 674–689.

* cited by examiner

Primary Examiner—Richard M. Camby
(74) Attorney, Agent, or Firm—Kenyon & Kenyon

(57) ABSTRACT

A method and a device for anti-slip control, in particular, for traction control, in a motor vehicle, in which, in a first operating mode, a braking force is applied individually to each driving wheel with a tendency to spin to reduces its slip, and in which, in a second operating mode, an output quantity of the driving motor is additionally reduced if two driving wheels on the same axle show a tendency to spin, thereby avoiding, in an especially reliable manner, unwanted switching from the first to the second operating mode. A switch from the first to the second operating mode takes place no earlier than the end of a first waiting time that is selected in proportion to the difference between the braking forces applied to the two driving wheels with a tendency to spin and occurs after the tendency to spin of the second driving wheel is detected.

13 Claims, 3 Drawing Sheets

METHOD AND DEVICE FOR ANTI-SLIP CONTROL, IN PARTICULAR FOR TRACTION CONTROL, IN A MOTOR VEHICLE

FIELD OF THE INVENTION

The present invention relates to a method for anti-slip control, in particular for traction control, in a motor vehicle, in which, in a first operating mode, a braking force is applied individually to each driving wheel with a tendency to spin to reduce its slip; and in which, in a second operating mode, an output quantity of the driving motor is additionally reduced if two driving wheels on the same axle show a tendency to spin. The present invention further relates to a device for carrying out the method.

BACKGROUND INFORMATION

In an anti-slip control device for a motor vehicle, the rotation of the driven wheels is ordinarily monitored by detecting the velocities of the driven wheels and comparing them with each other and/or with the velocity of a non-driven wheel. The anti-slip control system can be designed exclusively as a traction control system, as described, for example, in SAE paper 87,03,37 entitled "ASR—Traction Control—A Logical Extension of ABS". Alternatively, however, the anti-slip control system can be provided as part of a vehicle stability control system, which is used to control vehicle yaw rate by interventions in the vehicle brakes and motor, and in which an anti-slip controller is implemented as a secondary controller. The basic functions of a vehicle stability control system are described, for example, in the article entitled "FDR—Die Fahrdynamikregelung von Bosch" [FDR—Bosch Vehicle Stability Control System] published in Automobiltechnische Zeitschrift (ATZ) 96, 1994, Volume 11, pages 674–689.

According to a traction control device for a motor vehicle known, for example, from German Published Patent Application No. 29 14 165, differences between the velocities of announced and non-driven wheels are used to determine the tendency of the driving wheels concerned to spin. If a tendency to spin is detected, the driving wheel concerned is braked individually. The buildup of braking force can be dependent on the rotation of the driving wheel with a tendency to spin, in particular, it can be dependent on its slip. This operating mode, in which an individual braking force is applied to each driving wheel with a tendency to spin or already spinning independently of the other driving wheels, is also known as select-high (SH) mode.

In a further operating mode, also known as select-low (SL) mode, which is used primarily when two driving wheels on the same axle show a tendency to spin, the driving wheels concerned are not stabilized by an individual brake intervention at each wheel, but rather by a synchronous brake intervention with additional engine throttling.

During a starting motion, therefore, the known traction control system initially applies a braking action to a driving wheel when the latter shows a tendency to spin, while it switches from select-high to select-low mode if the second driving wheel also shows a tendency to spin. In select-low mode, drive slip at the two driving wheels is additionally controlled at least by reducing the driving torque of the motor vehicle driving motor. The driving torque of the driving motor is reduced until at least one of the driving wheels starts stabilizing.

In a traction control system of this type, it is especially important to switch between operating modes during a starting motion, in particular to switch from select-high to select-low mode. Indeed, if the driving wheels are on a roadway with varying coefficients of friction (known as a $\mu$-split roadway), the switch from select-high mode to select-low mode takes place even if the instability of the driving wheel running at a high coefficient of friction lasts only a short time.

Especially when starting on $\mu$-split roadways, braking force builds up at the first spinning driving wheel according to the slip detected there. A high driving torque that causes the wheel to spin generates a large level of drive slip at this wheel, resulting in high braking force being applied to this wheel in connection with the traction control system. This can cause instability in the wheel with a high coefficient of friction if the latter can no longer remain in contact with the roadway due to the torque now being transmitted by the breaking force buildup at the spinning wheel. However, this instability is normally of only short duration. Yet switching to select-low mode would reduce driving torque, so that a significant, unwanted drop in traction can be felt when starting.

SUMMARY OF THE INVENTION

An object of the present invention is therefore to provide a method for anti-slip control, in particular for traction control which can be used to avoid, in a particularly reliable manner, unwanted switching from the first to the second operating mode. Another object is to provide a device for anti-slip control in a motor vehicle that is especially suitable for carrying out the method.

With regard to the method, this object is achieved according to the present invention with a switch from the first to the second operating mode taking place no earlier than the end of a first waiting time that is selected in proportion to the difference between the braking forces applied to the two driving wheels with a tendency to spin and occurs after the tendency to spin of the second driving wheel is detected.

The present invention is based on the idea that unnecessary, and thus unwanted, switching from the first to the second operating mode can be avoided with particular reliability by suitably filtering the processing of the events triggering a switch. In this regard, only those events in which a change in roadway properties is detected with adequate reliability should be taken into account. An especially easy way to achieve such filtering is to introduce a waiting time during which a brake intervention is applied as early as the first operating mode (select-high mode) to both driving wheels with a tendency to spin before finally switching to the second operating mode (select-low mode). The waiting time should be specifically coordinated to detect typical roadway properties. This takes into account the fact that extremely variable roadway coefficients of friction at the two driving wheels is a highly probable indication of a $\mu$-split roadway, which means that both driving wheels can remain unstable for only a short period of time without requiring switching to select-low mode. Only minor differences in the coefficients of friction at the two driving wheels, on the other hand, are more likely to mean a roadway with a generally low coefficient of friction, which can make it necessary to switch to select-low mode. In selecting the waiting time length, therefore, the difference between the braking forces that act upon the two driving wheels and make it possible to determine the differences in the coefficients of friction, is suitably taken into account.

In the second operating mode, or select-low mode, the driving motor's output, rotational speed or another suitable quantity can be reduced as the output quantity of the driving motor. In this operating mode, however, the driving torque of the driving motor is suitably reduced as the output quantity of the driving motor.

In selecting the first waiting time, the amount of the difference between the brake pressures acting on the two driving wheels with a tendency to spin is advantageously taken into account as the quantity that is characteristic for the active braking forces. To determine the first waiting time, this difference, measured in bar, is suitably multiplied by a conversion factor of approximately 40 ms/bar, yielding, for example, a first waiting time of approximately 280 ms with a pressure difference of 70 bar.

An especially favorable performance of the traction control system, with only minor traction losses, can also be achieved by first switching from the first to the second operating mode and then switching back to the first operating mode, or select-high mode, as early as possible, taking safety considerations into account. In an especially advantageous embodiment, this is accomplished by a switch from the second to the first operating mode being carried out no earlier than the end of a second waiting time that is selected as a function of the braking force applied and occurs after the tendency to spin of a driving wheel is last detected.

An initial prerequisite for switching back is the passage of a certain minimum time in select-low mode without another deviation being detected. Switching back is possible at the end of this safety period. In determining the safety period, or second waiting time, the braking force applied in select-low mode is taken into account, and thus the information available about the road conditions. A pre-selectable maximum time of, for example, approximately 1,300 ms, which is reduced in proportion to the braking force applied, is suitably selected as the second waiting time. The maximum time is suitably reduced by the brake pressure applied, measured in bar, and multiplied by a conversion factor of approximately 20 ms/bar, thus yielding, for example, a second waiting time of approximately 300 ms with a brake pressure of 50 bar.

With regard to the device for anti-slip control in a motor vehicle, the object mentioned above is achieved with a control unit which, in a first operating mode, outputs actuating signals for setting an individual braking force at each driving wheel with a tendency to spin to reduce its slip, and which, in a second operating mode, outputs additional actuating signals to reduce an output quantity of the driving motor if two driving wheels on the same axle show a tendency to spin; and the object mentioned above is also achieved with a switching module that switches the control unit from the first to the second operating mode no earlier than the end of a first waiting time that is selected in proportion to the difference between the braking forces applied to the two driving wheels with a tendency to spin and occurs after the tendency to spin of the second driving wheel is detected.

The switching module suitably sets, as the first waiting time, the amount of the difference between the brake pressures, measured in bar, acting on the two driving wheels with a tendency to spin, multiplied by a conversion factor of approximately 40 ms/bar.

According to a particularly advantageous embodiment, the switching module switches the control unit from the second to the first operating mode no earlier than the end of a second waiting time that is selected as a function of the braking force applied and occurs after the tendency to spin of a driving wheel was last detected, with the switching module according to a further suitable embodiment selecting, as the second waiting time, a pre-selectable maximum time, minus the brake pressure (bar) applied that was multiplied by a conversion factor of approximately 20 ms/bar.

The particular advantages achieved by the present invention lie in the fact that, with especially simple means, it reliably takes into account the roadway properties when switching between the operating modes, due to the waiting time selected as a function of the braking forces applied. By additionally taking into account the brake pressure level of the driving wheel already being controlled, it is also possible to determine the current differences in the roadway coefficients of friction.

The short-term instabilities of both driving wheels, which occur, in particular, with $\mu$-split roadways, do not immediately trigger a switch from the first (SH) mode to the second (SL) mode. Instead, events of this type, which do not require switching to select-low mode due to the short-term nature of the instability, are filtered out of the possible switch triggers by suitably selecting the first waiting time. Furthermore, switching to select-low mode is not unnecessarily delayed, since only a first waiting time that is in proportion to the difference in braking forces, and consequently short, is selected, particularly in the case of roadways with a uniformly low coefficient of friction that requires switching to select-low mode. Switching to select-low mode can also take place, in particular, after curved travel of the motor vehicle has been detected. Likewise, switching back to the first (SH) mode take place after a comparatively short second waiting time that takes the road conditions into account.

DETAILED DESCRIPTION

Figure 1:
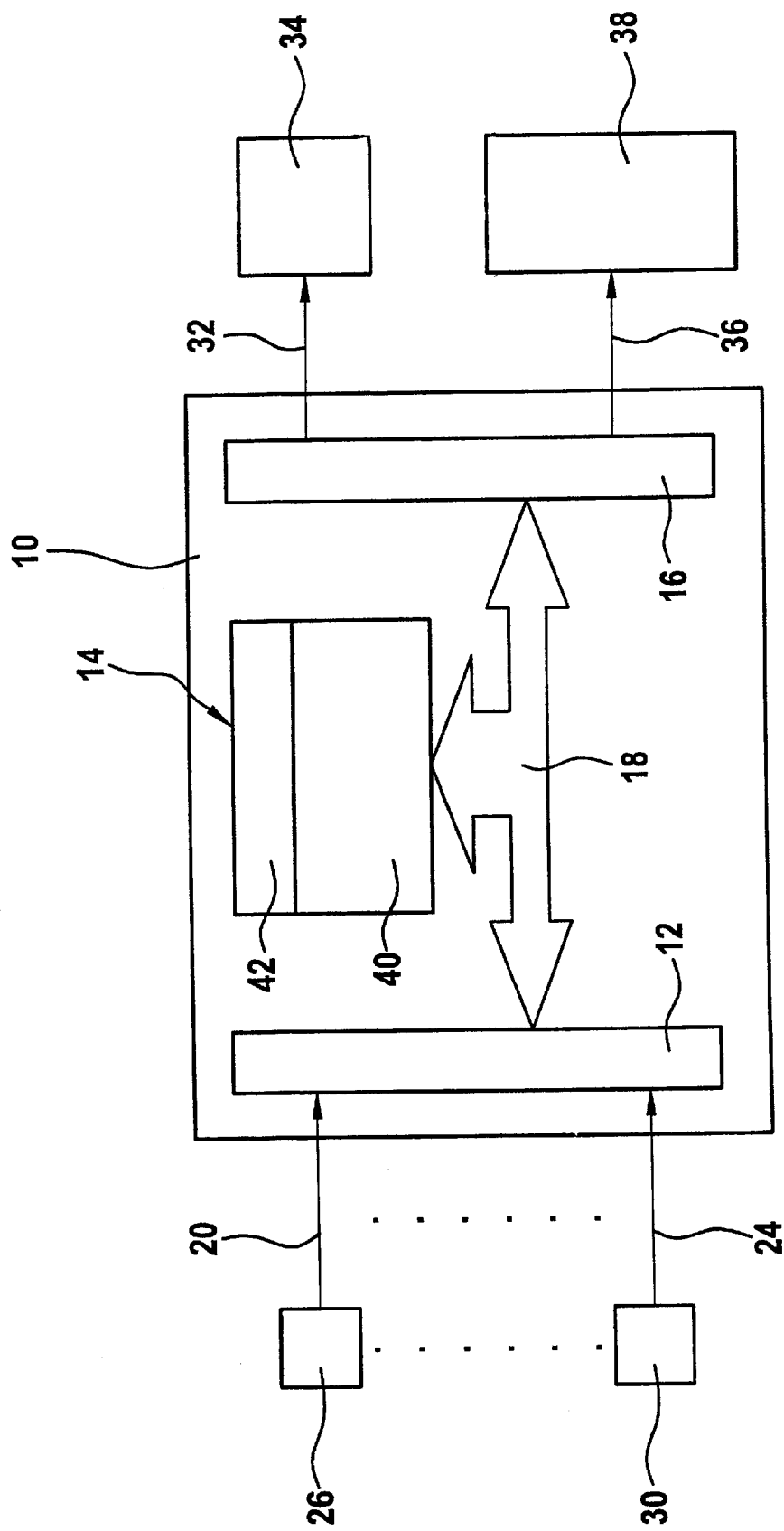
FIG. 1 shows a schematic diagram of a traction control device for a motor vehicle.

According to the embodiment, device 10 shown in FIG. 1 is provided for traction control in a motor vehicle that is not illustrated in any greater detail. As an alternative, however, device 10 can also be part of a vehicle stability control system as a way to implement a traction control system as a secondary controller. It includes an input circuit 12, a microcomputer 14 and an output circuit 16. These components are interconnected via a communication system 18 for the purpose of exchanging data with each other. Measuring signals can be supplied to input circuit 12 via a number of signal lines 20, 24, with these measuring signals being detected in measuring units 26, 30 connected to signal lines 20, 24. Characteristic operating quantities of the motor vehicle can be derived from the measuring signals either directly of after conversion. The operating quantities are, in particular, the velocities of the vehicle wheels. Other signals representing the vehicle velocity as well as the braking forces, brake torques and/or brake pressures acting upon each wheel can be supplied to the input circuit in the same manner.

Within the scope of the control functions that it performs, device 10 also outputs manipulated variables via output circuit 16 and the output lines connected to it. For example, an output line 32 leads to an actuating element 34 to influence the output of the motor vehicle drive unit. This actuating element 34 is an engine control unit in the embodiment of an internal combustion engine, for example a control unit for operating an electrically operated throttle valve. In addition, brake system 38 of the vehicle can be controlled via a number of output lines 36, only one of which is illustrated. The brake system can be a hydraulic or pneumatic system or a brake system with electromotive power supply to the brakes. For traction control, these brake systems have a switching arrangement (not illustrated in greater detail) that enables the braking force to build up at the wheel concerned via the braking force set by the driver when pressing the brake pedal.

Microcomputer 14 includes a control unit 40 and a switching module 42 that interacts with this unit. Control unit 40 is designed to act on brake system 38 and actuating element 34 in a first, or select-high, mode or in a second, or select-low, mode. In both modes, the particular wheel slip of the motor vehicle driving wheels is determined by comparing the wheel velocity of the particular wheel to a suitable reference value. The wheel velocity of a different wheel, preferably a non-driven wheel, can be used as the reference value.

A tendency to spin of the driving wheel in question is detected if the wheel velocity of a driving wheel exceeds a threshold value derived from the reference value. The amount by which the threshold value is exceeded determines the magnitude of slip. If slip occurs at only one driving wheel, control unit 40 is operated in the first, or select-high, mode. In this mode, the wheel with a high coefficient of friction determines the control, with the braking force being modulated at the spinning wheel to reduce slip.

If a tendency to spin is detected at both driving wheels, the driving wheels may be spinning on both sides due to an excessively high driving torque on a roadway with a homogeneous, low coefficient of friction. In this case, control unit 40 is operated in the second, or select-low, mode. The wheel with the low coefficient of friction determines the control, and the driving torque of the driving motor is reduced until at least one driving wheel becomes stable again.

Switching from the first, or select-high, mode to the second, or select-low, mode and switching from the second to the first mode is controlled by switching module 42, which acts upon control unit 40. Switching module 42 is designed for an especially efficient operation with respect to selecting the respective modes. This takes into account the fact that the vehicle should be operated as long as possible in select-high mode and as little as possible in select-low mode to avoid unwanted drops in traction as far as possible, especially when the vehicle is starting.

Figure 2:
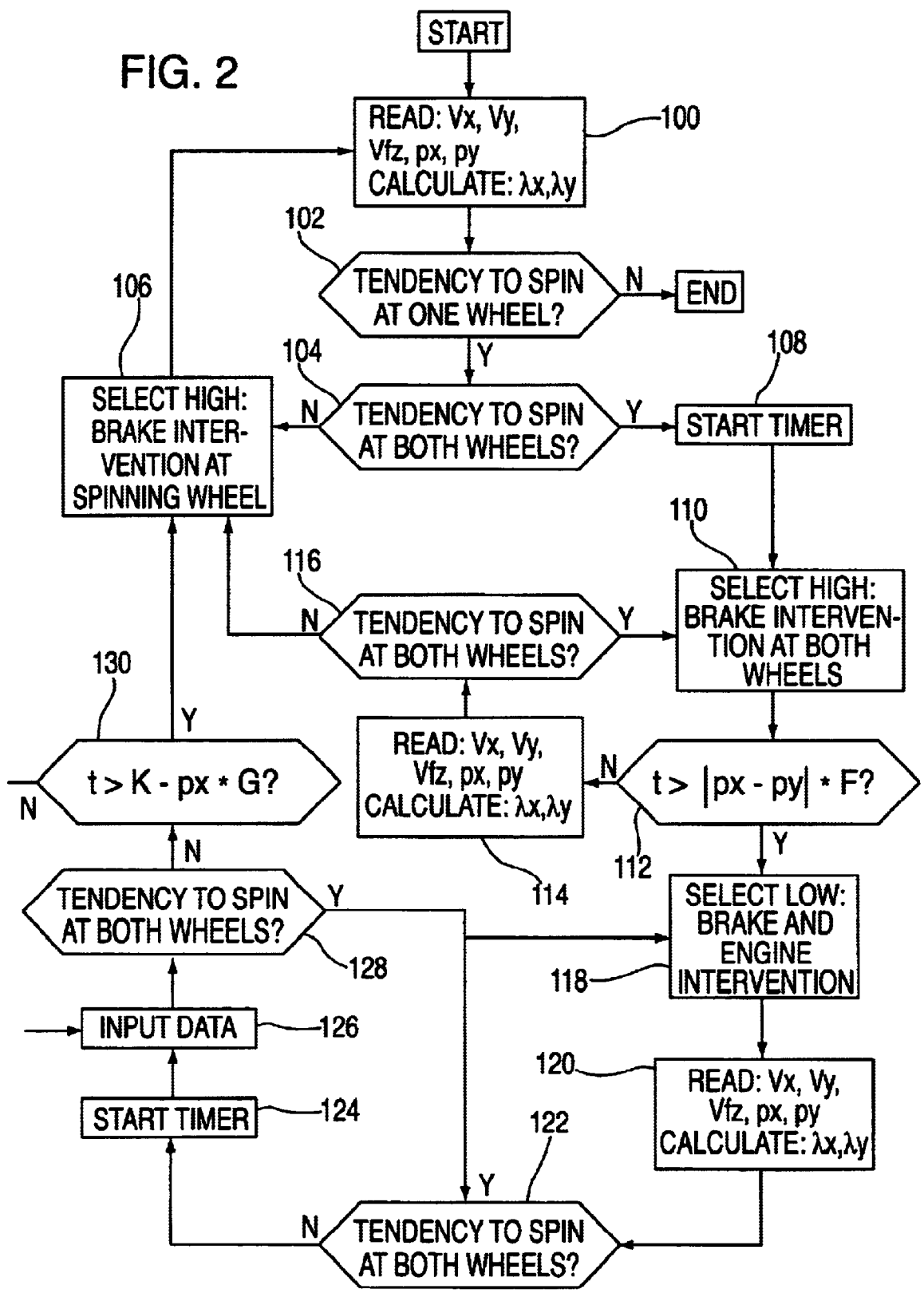
FIG. 2 shows a flowchart of a traction control method for a motor vehicle.

For this purpose, switching module 42, which can also be stored in microcomputer 14 in the form of a computer program, operates in the manner outlined by the flowchart shown in FIG. 2.

After launching the corresponding program or subroutine at specific points in time, which can be provided at regular intervals in the manner of a cyclic interrogation, for example, signal values characterizing velocities Vx, Vy of the driving wheels, a signal value characterizing vehicle velocity Vfz and signal values characterizing brake pressures px, py at the driving wheels are input in a first program step 100. Slip quantities 1x, 1y of the driving wheels are derived from velocities Vx, Vy by comparison with vehicle velocity Vfz. Subsequent program step 102 checks whether, and possibly at which driving wheel, a tendency to spin occurs, based on slip quantities 1x, 1y, for example by comparison with a still permissible slip limit value. The program or subroutine ends if no tendency to spin is detected.

However, if a tendency to spin is detected at a driving wheel, subsequent program step 104 then checks whether a tendency to spin also occurs at the other driving wheel. If not, the spinning driving wheel is defined as the wheel with low coefficient of friction and the non-spinning driving wheel as the wheel with high coefficient of friction. Select high (SH) mode is then set in program step 106, and a brake intervention carried out as a function of slip. The program then repeats, starting with program step 100, until a tendency to spin occurs at a driving wheel.

If program step 104 determines that a tendency to spin is present at both driving wheels, a timer is started in program step 108. Select-high (SH) mode is then activated in program step 110, and brake intervention is activated at both driving wheels with a tendency to spin, with the possibility of a selective decrease in braking force at the wheel with low coefficient of friction occurring as needed to ensure vehicle stability.

Program step 112 subsequently checks whether a time exceeding a first waiting time t1 has passed since the timer was started. First waiting time t1 is selected to equal the amount of the difference between brake pressures px, py acting on the two driving wheels with a tendency to spin, multiplied by a conversion factor F. If brake pressures px, py are evaluated in bar, conversion factor F amounts to approximately 40 ms/bar in the embodiment. If the time that has passed since the timer was started is still less than first waiting time t1, updated measured values for quantities Vx, Vy, Vfz, px and py are input in program step 114, and updated slip quantities 1x, 1y are detected. Program step 116 subsequently checks whether the two driving wheels still show a tendency to spin. If so, program step 110 is run again. In other words, program steps 110, 112, 114 and 116 run consecutively in a loop (with continuous, individual brake interventions at the driving wheels in select-high mode) until either program step 112 determines that a time exceeding first waiting time t1 has passed since the timer was started or until program step 116 determines that neither of the driving wheels show a tendency to spin any longer.

In the latter instance, i.e. if at least one driving wheel no longer shows a tendency to spin, the method continues with program step 106, i.e. with individual brake intervention in the only driving wheel still showing a tendency to spin in select-high mode. In this case, which can occur in the form of a short-term instability, for example, when starting on a $\mu$-split roadway, the traction control system can thus operate entirely in select-high mode until the driving situation has finally stabilized, thus avoiding unnecessary activation of select-low mode.

Only if program step 112 determines that a time exceeding first waiting time t1 has passed since the timer was started, without at least one driving wheel stabilizing in the meantime, does the method continue with program step 118 by switching to select-low mode. In this mode, a synchronous brake intervention at both driving wheels with a tendency to spin occurs, supported by a reduction in driving torque as the output quantity of the driving motor.

After this operating mode has been activated, updated measured values for quantities Vx, Vy, Vfz, px and py are input and updated slip quantities 1x, 1y detected in program step 120. Program step 122 then checks whether both driving wheels still show a tendency to spin. If so, the method continues in a loop with program step 118, with continuous brake and engine interventions occurring in select-low mode. This continues until the successful stabilization of at least one driving wheel is detected in program step 122.

In this case, a timer is restarted in program step 124. Updated measured values for quantities Vx, Vy, Vfz, px and py are input and updated slip quantities 1x, 1y detected in program step 126. Program step 128 then checks whether both driving wheels again show a tendency to spin. If so, the procedure continues with program step 118, i.e. with continued brake and engine interventions in select-low mode.

If, however, the repeated tendency to spin of the second driving wheel has not been detected, program step 130 checks whether a time exceeding a second waiting time t2 has passed since the timer was started. Second waiting time t2 is selected to be equal to a pre-selectable maximum time K of approximately 1,300 ms, minus the brake pressure applied (measured in bar) that was multiplied by a conversion factor G of approximately 20 ms/bar.

If the time that has passed since the timer was started is still less than second waiting time t2, program steps 126, 128 are repeated. The method does not go on to program step 106 until a time exceeding the second waiting time has passed without both driving wheels again showing a tendency to spin in the meantime. This ensures that, once it has been activated, select-low mode continues until at least one driving wheel has completely stabilized. On the other hand, however, the specified second waiting time for switching back to select-high mode is dependent on brake pressure and can therefore also be relatively short, thus making it possible to switch back comparatively quickly to select-high mode, depending on the situation.

Figure 3:
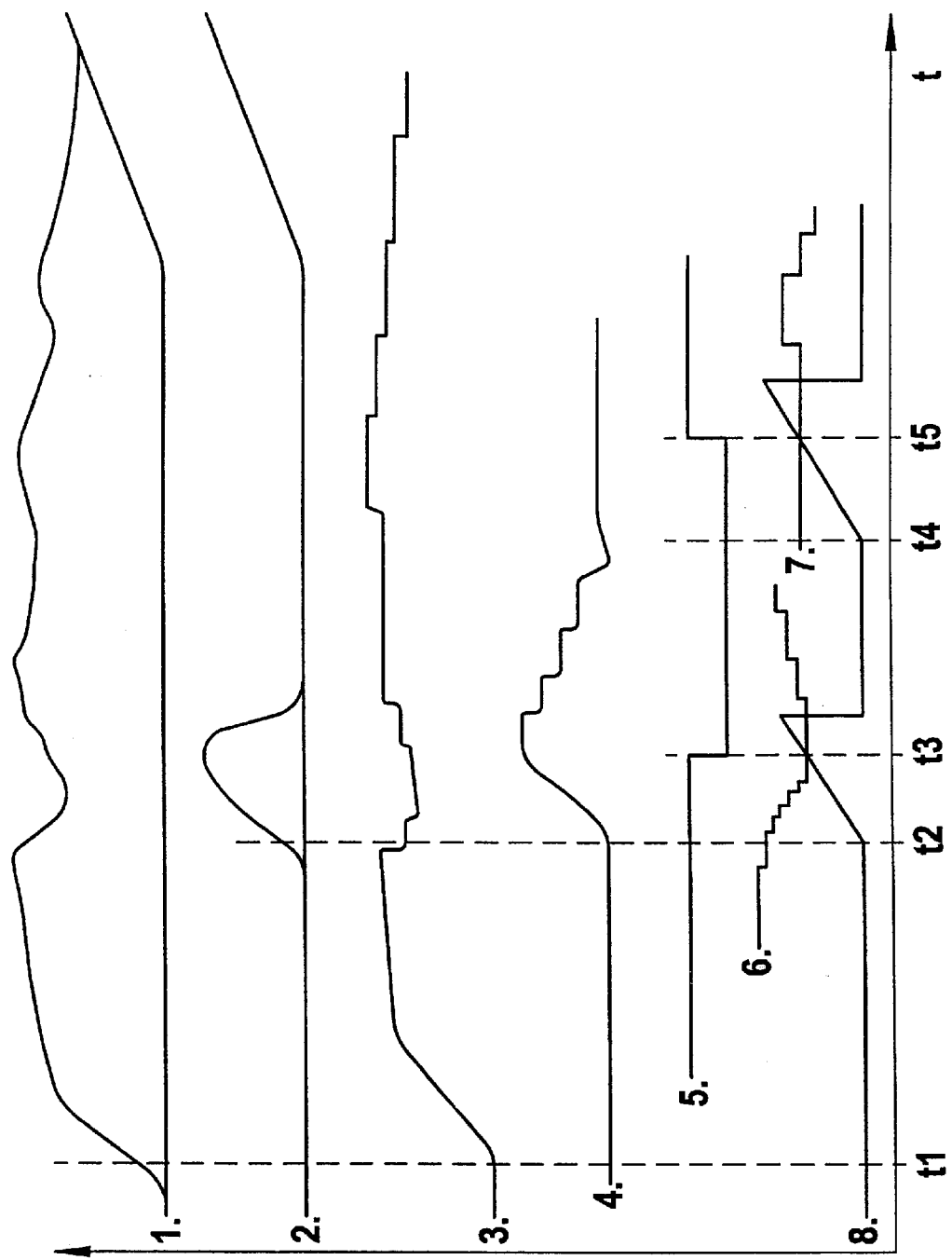
FIG. 3 shows a timing diagram to explain the operation of the device shown in FIG. 1 and operated according to the method shown in FIG. 2.

The procedure of the method described is shown in the timing diagram in FIG. 3. The following are plotted as a function of time (in sequence from top to bottom): 1. velocity Vx of the first driving wheel compared with vehicle velocity; 2. velocity Vy of the second driving wheel compared with vehicle velocity; 3. brake pressure px at the first driving wheel; 4. brake pressure py at the second driving wheel; 5. mode status (1=SH, 0=SL); 6. calculated first waiting time t1; 7. calculated second waiting time t2; 8. the time that has passed since a timer was started.

The timing diagram shows the following behavior of the above-mentioned quantities over time:

Time T1: velocity Vx of the first driving wheel compared with vehicle velocity exceeds a limit value: slip of the first driving wheel is detected. Brake pressure px at the first driving wheel is thus increased in select-high mode (status according to curve 5.).

Time T2: velocity Vy of the second driving wheel compared with vehicle velocity also exceeds a limit value: slip of the second driving wheel is also detected. Brake pressure py at the second driving wheel is thus also increased in select-high mode (status according to curve 5.). The timer is started, and the time that has passed since then is measured (curve 8.). The first waiting time (curve 6.) is detected continuously from brake pressures px, py.

Time T3: the elapsed time (curve 8.) exceeds the first waiting time (curve 6.). This triggers a switch to the second, or select-low, mode (status according to curve 5.).

Time T4: a tendency to spin is no longer detected at the second driving wheel, and the pressure level is below a pre-selectable limit value. The timer is restarted, and the time that has passed since then is measured (curve 8.). The second waiting time (curve 7.) is continuously detected anew from brake pressure px still being applied. The length of this waiting time therefore decreases as pressure px increases.

Time T5: the elapsed time (curve 8.) exceeds the second waiting time (curve 7.) without a tendency to spin of the second driving wheel being detected again in the meantime. This triggers a return to the first, or select-high, mode (status according to curve 5.).

In conclusion, note that both the contents of SAE Paper 87,03,37 and the contents of the Bosch publication entitled "FDR—Die Fahrdynamikregelung" [FDR—Vehicle Stability Control System].

What is claimed is:

1. A method for achieving an anti-slip control in a motor vehicle, comprising the steps of:

in a first operating mode, applying a braking force individually to each driving wheel with a tendency to spin to reduce a slip thereof; and in a second operating mode, reducing an output quantity of a driving motor if two driving wheels on the same axle show the tendency to spin, wherein:

a switch from the first operating mode to the second operating mode occurs no earlier than an end of a first waiting time that is selected in proportion to a difference between the braking forces applied to the two driving wheels with the tendency to spin, and the switch from the first operating mode to the second operating mode occurs after the tendency to spin of a second one of the two driving wheels is detected.

2. The method according to claim 1, wherein:

the anti-slip control corresponds to a traction control.

3. The method according to claim 1, further comprising the step of:

reducing a driving torque of the driving motor in the second operating mode as the output quantity of the driving motor.

4. The method according to claim 1, wherein:

an amount of a difference between brake pressures acting on the two driving wheels with the tendency to spin, multiplied by a conversion factor of approximately 40 ms/bar, is selected as the first waiting time.

5. The method according to one of claim 1, further comprising the step of:

performing a switch from the second operating mode to the first operating mode no earlier than an end of a second waiting time that is selected as a function of the braking force applied and occurs after the tendency to spin of one of the two driving wheels was last detected.

6. The method according to claim 5, further comprising the step of:

selecting a pre-selectable maximum time that is reduced in proportion to the braking force applied as the second waiting time.

7. The method according to claim 6, further comprising the step of:

pre-selecting a maximum time of approximately 1,300 ms.

8. The method according to claim 6, further comprising the step of:

in order to select the second waiting time, reducing the maximum time by a brake pressure applied and multiplying the reduced maximum time by a conversion factor of approximately 20 ms/bar.

9. A device for achieving an anti-slip control in a motor vehicle, comprising:
- a control unit which, in a first operating mode, outputs actuating signals for setting an individual braking force at each driving wheel with a tendency to spin to reduce a slip thereof and which, in a second operating mode, outputs additional actuating signals to reduce an output quantity of a driving motor if two driving wheels on the same axle show a tendency to spin; and
- a switching module that switches the control unit from the first operating mode to the second operating mode no earlier than an end of a first waiting time that is selected in proportion to a difference between the braking forces applied to the two driving wheels with the tendency to spin, the switch from the first operating mode to the second operating mode occurring after the tendency to spin of the second one of the two driving wheels is detected.

10. The device according to claim 9, wherein:

the anti-slip control corresponds to a traction control.

11. The device according to claim 9, wherein:

the switching module sets, as the first waiting time, an amount of a difference between the brake pressures acting on the two driving wheels with the tendency to spin, multiplied by a conversion factor of approximately 40 ms/bar.

12. The device according to claim 9, wherein:

the switching module switches the control unit from the second operating mode to the first operating mode no earlier than an end of a second waiting time that is selected as a function of the braking force applied and occurs after the tendency to spin of one of the driving wheels was last detected.

13. The device according to claim 12, wherein:

the switching module selects, as the second waiting time, a pre-selectable maximum time, minus a brake pressure applied that is multiplied by a conversion factor of approximately 20 ms/bar.

* * * * *

UNITED STATES PATENT AND TRADEMARK OFFICE
CERTIFICATE OF CORRECTION

PATENT NO. : 6,618,662 B2
DATED : September 9, 2003
INVENTOR(S) : Johannes Schmitt et al.

It is certified that error appears in the above-identified patent and that said Letters Patent is hereby corrected as shown below:

Column 8,
Line 14, change "… Stability Control System]." to -- … Stability Control System] mentioned in the above description. --.

Signed and Sealed this

Thirtieth Day of November, 2004

JON W. DUDAS
*Director of the United States Patent and Trademark Office*